United States Patent [19]
Jeffs

[11] Patent Number: 5,252,271
[45] Date of Patent: Oct. 12, 1993

[54] BIODEGRADABLE PACKAGING FOAM AND METHOD OF PREPARATION

[75] Inventor: Hyrum J. Jeffs, Lehi, Utah

[73] Assignee: Bio-Products International, Midvale, Utah

[21] Appl. No.: 781,509

[22] Filed: Oct. 22, 1991

[51] Int. Cl.$^5$ ............................................. B29C 67/22
[52] U.S. Cl. ........................................ 264/54; 264/51; 264/148
[58] Field of Search ...................... 264/51, 53, 54, 148; 106/210, 213

[56] References Cited

U.S. PATENT DOCUMENTS

| | | | |
|---|---|---|---|
| 3,962,155 | 6/1976 | Usamoto et al. | 264/DIG. 17 |
| 4,863,655 | 9/1989 | Lacourse et al. | 264/53 |
| 4,900,361 | 2/1990 | Sachetto et al. | 106/213 |
| 5,035,930 | 7/1991 | Lacourse et al. | 264/53 |
| 5,043,196 | 8/1991 | Lacourse et al. | 264/53 |
| 5,116,550 | 5/1992 | Perkins | 264/54 |
| 5,153,037 | 10/1992 | Altieri | 264/53 |

*Primary Examiner*—Allan R. Kuhns
*Attorney, Agent, or Firm*—Thorpe, North & Western

[57] ABSTRACT

A closed cell, light weight packaging material having biodegradable properties and being formed initially from a nonmodified starch material which has been modified by reaction within an extrusion barrel with (i) a mild acid selected from the group consisting of malic acid, tartaric acid, citric acid, maleic acid and succinic acid in the presence of water and (ii) a carbonate composition to generate $CO_2$ gas. This modified starch material has decreased molecular weight and a dominant pattern of nonuniformity of hydrogen bonding within and between starch chains, and a dominant pattern of structural randomness of the starch chains. The resultant packaging material has a closed cellular structure with a density less than 0.032 grams per cubic centimeter and with resilient properties which enable substantial return of the compressed structure to its original, expanded shape with structural integrity. Also set forth is a process for preparing this material, as well as modification for enhancing hydrophobicity.

12 Claims, 2 Drawing Sheets

BIODEGRADABLE PACKAGING FOAM AND METHOD OF PREPARATION

BACKGROUND OF THE INVENTION

1. Field of Invention

This invention relates to packing materials formed as foamed pellets or peanuts for use as filler in shipping containers and other storage cartons. More particularly, the present invention pertains to such filler materials which are formed of starch composition, thereby providing biodegradability.

2. Prior Art

The increased interest in the environmental safety and biodegradability of packing materials has led to a variety of new products which dissolve harmlessly in water, rather than accumulate in landfills. For example, large volumes of packaging foam filler are produced and used to protect items in containers from damage during shipping. This high volume, foam filler has mainly been produced from polymers, such as polystyrene, which are not biodegradable. The accumulation of such polymers in landfills is of major concern because it occupies large volumes of space for the nominal weight of the product. Furthermore, these polymers do not readily degrade and therefore create long term difficulties for waste management. Attempts to burn these polymers generates noxious or toxic gases, further limiting disposal options. In addition to the adverse nature of the polystyrene polymers as a final product are the environmental hazards of their preparation. For example, chlorofluorocarbons (CFC's) used in the preparation of polystyrene foam, commonly called Styrofoam (registered trademark of Dow Chemical Co), are harmful to the earth's ozone layer.

Although these foamed polymers are useful in filling space as packing materials, their hydrophobic character tends to enhance electrostatic charge buildup. This is particularly true for the polystyrene materials which are often used as shipping material for electronic components. It is well known that such electrostatic accumulation poses a risk to much of the electronic equipment and software which may be affected by the presence of an electric field. It is not surprising, therefore, that substantial interest has developed in the use of starch composition as a substitute for polystyrene polymers, particularly in production of packing materials.

Starch offers several clear advantages over polymers previously used in this field. Starch is well known to be biodegradable and is a natural renewable resource that is produced in excess of the present market demand. Because starch is hydrophilic, it does not retain an electrostatic charge as occurs with hydrophobic polymers. Due to this hydrophilicity, packaging foam fillers prepared from starch can be readily dissolved in water as part of their natural decomposition. This obviously reduces their volume many times and allows them to be disposed in a normal waste water system.

Although starch has been used as protective packaging foam filler as disclosed in U.S. Pat. No. 4,863,655 and 4,900,361, general utility has not yet been commercially acceptable. Realization of acceptable resiliency, compressibility and low bulk density have required the use of starch which is derived from special plants that produce high amylose content, generally in excess of 45%, or which has been subjected to purification or modification procedures before being expanded by extrusion. The hydrophilic nature of starch materials creates some difficulties where moisture may degrade the packing materials, frustrating their function as a filler and causing unacceptable contamination of the products or equipment packed within the foamed material. Therefore, there remains a need for a foamed starch packing material which offers the desired resiliency, compressibility and low bulk density discovered in the polystyrene polymers, which retains these properties over extended time and which can be manufactured inexpensively with raw starch in a reproducible manner.

OBJECTS AND SUMMARY OF THE INVENTION

It is an object of the present invention to provide a starch form of packing material which can be readily produced from raw starch to generate a low density, foamed composition having a stable closed cell structure which offers the required resiliency and compressibility of a packing material.

It is a further object of this invention to provide an inexpensive and simple process for mass producing foamed starch packing material which produces a totally biodegradable product without adverse effect on the environment.

It is yet another object of the present invention to provide such packing material which offers resistance to water degradation and fire.

These and other objects are realized in the present invention which provides a biodegradable protective packaging foam filler comprising a native surplus starch to which 0.2 to 7% di- or tricarboxylic acid such as malic acid, tartaric acid, citric acid, maleic acid and succinic acid, and 0.1 to 2% bicarbonate or carbonate is added prior to extrusion. In a surprising manner, these simple three components in proper water content (less than 30%) can be expanded by extrusion into packaging foam which has excellent compressibility, resiliency and low bulk density. More particularly, the expanded packaging filler of this invention has an elongated, closed cell structure with a bulk density of less than about 0.032 g/cubic cm, a resiliency of at least about 60% and a compressibility of from 50 to 1000 g/cm squared.

This composition is prepared in accordance with the following basic procedures, comprising the steps of:

a) selecting a dry, powdered, starch material having no greater than 30% (w) water content;

b) admixing to the starch material a mild acid in dry, powdered form selected from the group consisting of malic acid, tartaric acid, citric acid, maleic acid and succinic acid, said acid being at a composition percentage of 0.2 to 7% (w) of the total starch composition;

c) admixing to the starch material a dry, powdered carbonate composition capable of reacting with acid to generate $CO_2$ gas, said carbonate composition being at a composition percentage of 0.1 to 2% (w) of the total starch composition;

d) introducing the combined dry materials of steps a), b) and c) within an initial stage of a screw impeller within an extrusion means;

e) adding sufficient water to the combined dry materials of step d) at the initial stage of the impeller to convert the dry materials to a gelatinous state when subjected to elevated temperatures and pressures within the extrusion means;

f) mixing and advancing the combined ingredients of step e) within an extrusion barrel of the extrusion means to generate elevated heat and pressure for converting the material to the gelatinous state;

g) concurrently reacting the acid within the extrusion barrel (i) with the starch material for decreasing molecular weight of the starch material while disrupting the uniformity of hydrogen bonding within and between starch chains, and (ii) with the carbonate material to produce CO2 for expanding the starch at reduced molecular weight and increased structural randomness of the starch chains; and g) discharging the product of step f) through a die opening to generate expansion of the CO2 to form a closed cellular structure having a density less than 0.032 grams per cubic centimeter and with resilient properties which enable substantial return of the compressed structure to its original, expanded shape with structural integrity.

Other additives, such as borax, can be added to enhance stability of the final product in water as well as provide fire retardency. Other objects and features of the present invention will be apparent to those skilled in the art, based on the following detailed description, in combination with the accompanying drawings.

DESCRIPTION OF PREFERRED EMBODIMENT

Figure 1:
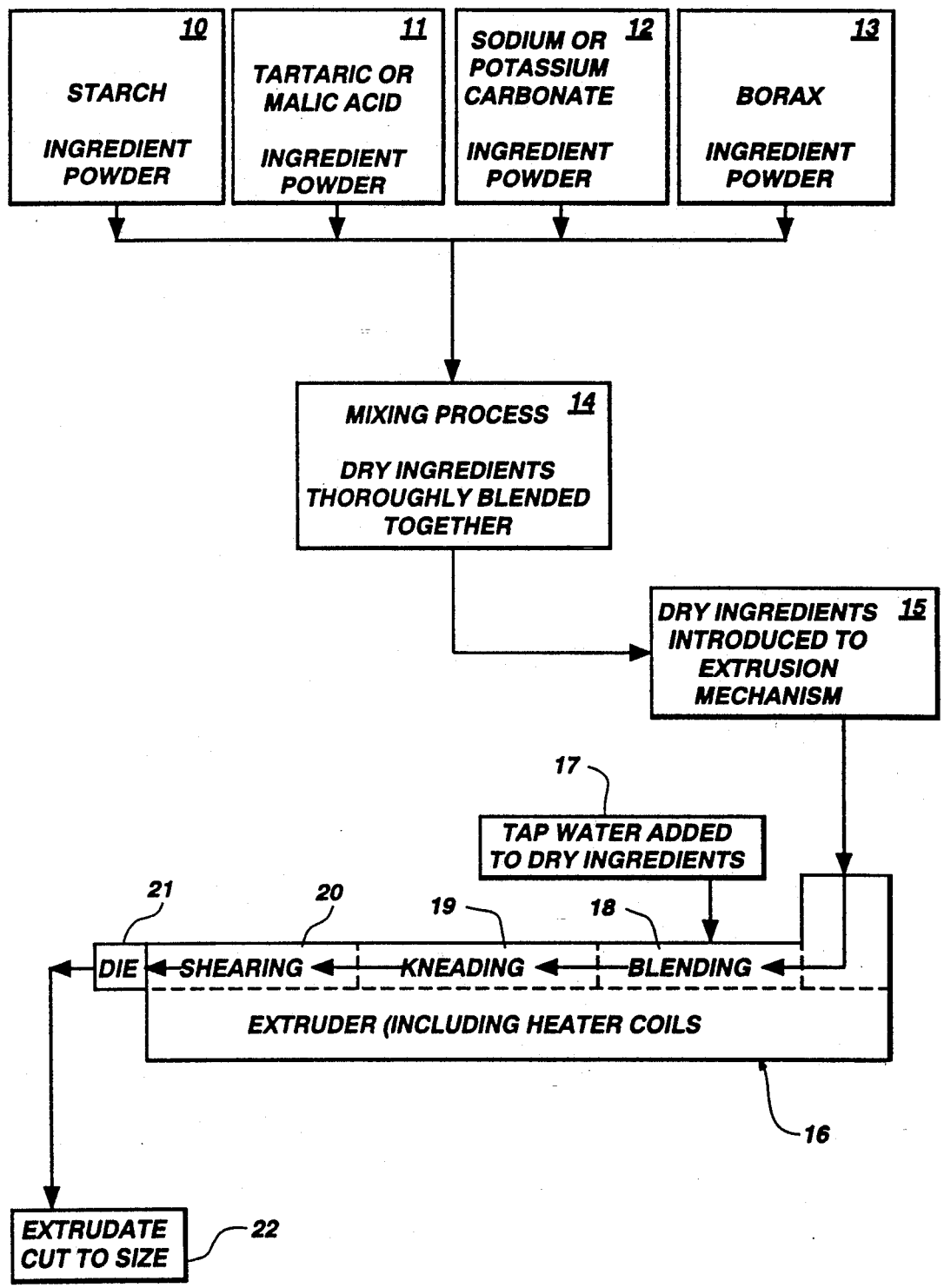
FIG. 1 illustrates a block diagram of the preferred procedure for preparing the packaging filler material of the present invention.

The present invention provides a biodegradable, protective packaging foam filler using only three, inexpensive products. It is produced through an extruder similar to extruders commonly used in preparation of food products such as puffed corn starch. Similar processing technology applies and will not be discussed in any detail.

The first and primary constituent is native, surplus starch which is readily available from many sources. Potato starch, for example, has been shown to work very well and may be acquired as raw, unmodified starch in powdered form. Other forms of starch may likewise be used, such as corn starch, soy bean starch, etc. A significant feature of the present invention is the ability to use raw, unmodified in the extrusion of this product, rather than starch materials that have to be specially prepared.

It is important that the starch have no more than 30% water content, and preferably less than 25%. The level of water content in the starch affects the viscosity of the gelatinous state of the starch within the extruding barrel and therefore affects the consistency of the extrudate dispensed through the extrude die. The specific selection of water content involves a determination of water content as actually occurs at the end of the extruder barrel. This water content includes the original water content in the raw starch, the amount of water absorbed during storage and the water which is physically added prior to introducing the mixture into the extruder barrel. This cumulative water content should not exceed 30% (w) of the weight of starch added to the mixture, and preferably will fall within the range of 20% to 25%.

Initially, the starch is in powdered form to facilitate admixture with the dry, mild acid and carbonate materials, which are in powdered form. The acid is preferably malic acid, but may also be other mild acids selected from the group consisting of malic acid, tartaric acid, citric acid, maleic acid and succinic acid. These acids fall within the class of di- or tricarboxylic acids which enable the concurrent reactions with the starch an carbonate constituents of the mixture within the extruder barrel. The significance of the concurrent reactability of the acid will be explained hereafter.

The amount of acid being added is a small percentage of the total starch content, within the approximate range of 0.2 to 7% (w) of the total starch composition. A more preferred concentration is in the range of 0.5 to 5% (w) mild acid. A proper percentage of acid constituent is essential to generate the proper rate of expansion of CO2 within the chained structure of the starch, as well as developing a proper degree of nonuniformity within the starch chain structure. This nonuniformity occurs with the reaction of the acid with the starch material, breaking the starch molecules into smaller molecular weight. This occurs by reason of the well known acid hydrolysis reaction. This reduction in molecular weight allows the starch to melt at lower temperatures and lose its crystaline state. In this melt condition, the starch molecules take on a random, disordered configuration, wherein the starch chains become entangled. By maintaining this disordered state through the extrusion process, the resulting extrudate exhibits improved flexibility, resiliency and compressibility.

This random, unordered state of the starch chains is preserved by a third function of the acid. This arises because of the multiple functionality of the di- or tricarboxylic groups on the acids selected, which prevents the starch molecules from returning to their normal, highly ordered, crystalline state. Specifically, these carboxylic groups provide additional hydrogen bonds which disrupt the normal crystallinity of the starch.

Finally, the temperatures within the extruder barrel are sufficiently high to enable ester linkages with the starch by the acid, further disrupting and modifying the normal crystallinity of the starch. Typical temperature ranges for the reaction identified above are within the range of 170 degrees C. to 195 degrees C., based on proper mixtures of starch, acid and carbonate, and correct advancement techniques of the gelatinous mixture through the extruder barrel.

In summary, the mild acids selected in this invention (i) break up the starch molecules, (ii) reducing melting temperature and allowing the starch chains to entangle; (iii) supply additional hydrogen bonding sites to bind the starch molecule in this disordered array; and (iv) enable formation of ester linkages with the starch to further block the starch from regaining its orderly, crystalline state. As a consequence, the former orderly crystalline structure of the starch material is now permanently locked into a random, nonuniform structure. This results in a material with increased flexibility, resilience and compressibility.

The later feature of compressibility is further enhanced by the concurrent reaction of the acid with the carbonate material, which generates CO2 necessary to lower the density as the starch captures pockets of CO2 gas, forming a closed, cellular structure. Although the admixing of carbonate material is listed as a subsequent step to the admixing of acid, it will be apparent that these steps could be reversed. From a procedural viewpoint, the addition of the acid carbonate powdered material to the powdered starch results in a uniform dispersion of the three constituents, regardless of their order of addition. This is illustrated in FIG. 1, which shows the addition of starch 10, acid 11 and carbonate 12 (as well as borax 13) without respect to order.

The specific type of carbonate material does not appear to be critical, so long as the customary acid hydrolysis reaction occurs, releasing CO2 into the starch structure. Sodium or potassium carbonate or sodium bicarbonate are useful for this purpose. Other carbonate sources will also be known to those of ordinary skill in the art. The appropriate concentration of carbonate within the mixture is approximately within the range of 0.2 to 2% (w) of the total starch composition, with a preferred range of 0.2 to 1% (w) carbonate concentration.

Once the admixed dry materials of starch, acid and carbonate are mixed 14 to a uniform dispersion, the resultant mixture is advanced 15 to an initial stage of a screw impeller 16 within an extruder. At this point, additional water 17 may be added to the dry materials at the initial stage of the impeller to convert the dry materials to a gelatinous state when subjected to elevated temperatures and pressures within the extruder barrel. The screw impeller mixes and advances the product within the extrusion barrel and generates elevated heat and pressure for converting the material to the gelatinous state. It is this environment of increased temperature and pressure that causes the concurrent reactions of the acid (i) with the starch material for decreasing molecular weight of the starch material while disrupting the uniformity of hydrogen bonding within and between starch chains, and (ii) with the carbonate material to produce CO2 for expanding the starch at reduced molecular weight and increased structural randomness previously explained.

When this mixture is advanced within the extruder barrel 16, the heat provided by heater coils, combined with the heat of the friction of mixing and movement, produces a clear, gel-like melt. The pressure, temperature and mobility of the contents subjected to the mixing 18 and kneading 19 and shearing 20 action of the screw drives of the extruder barrel causes the acid to contact and react with the bicarbonate as follows:

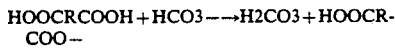

The H2CO3 in turn undergoes the following reaction as pressure is released at the die outlet 21 of the extruder barrel:

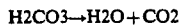

The volume of the CO2 gas produced in this melt state increases by about 20 times once it exits the extruder. The result is a formation of a closed cellular structure 22 and greatly reduced bulk density. Because of the random structure and disorder of the starch chains, CO2 can be captured and held within closed cells 23 of the structure (FIG. 2) when the extrudate cools and solidifies. The desired properties of flexibility, resilience and compressibility are therefore permanently locked within the memory of the final product. This product has a density less than 0.032 grams per cubic centimeter and resilient properties which enable substantial return of the compressed structure to its original, expanded shape with structural integrity.

EXAMPLE

In accordance with the steps outlined in FIG. 1, a packaging material was prepared as follows. 100 lbs. grams of raw, dry, powdered, nonmodified, native potato starch material having no greater than 25% (w) water content was placed in a mixing device such as a cement mixer. 5 lbs. of dry, powdered malic acid was admixed with the starch material, along with 0.25 lbs. of sodium bicarbonate in dry, powdered form. After this mixture was thoroughly dispersed throughout the starch, the mixture was fed to the input side of an twin screw extruder barrel. This extruder was manufactured by Wenger, Mfg. Co. and consisted of a pair of screw impellers in side-by-side relationship which rotated in counter directions.

At this point sufficient water was added to the dry, powdered mixture of starch, malic acid and sodium bicarbonate to convert the dry materials to a gelatinous state when subjected to elevated temperatures and pressures within the extruder. The actual amount of water was estimated to be 0.33 lbs., which was sprayed directly into the powdered mixture. The mixture and water were then processed within the extruder barrel by rotating the respective screw impeller so that the material was advanced down the barrel.

Initially, the materials were carried along the barrel by a screw configuration which primarily operated as a mixer/conveyor stage. The next stage comprised a kneading stage wherein the impeller blades were configured for kneading the mixture while conveying it forward along the barrel. The third stage of the screw configuration was another conveyor stage, which transferred the kneaded material to a fourth stage comprising a shearing blade assembly. This fourth section generated elevated heat and pressure for mechanically breaking up the starch chains, as well as completing the reaction of the acid and carbonate materials with the starch.

These reactions cooperated to decrease molecular weight of the starch material while disrupting the uniformity of hydrogen bonding within and between starch chains. The acid reaction with the carbonate material operated to produce CO2 for expanding the starch at reduced molecular weight and increased structural randomness of the starch chains. The temperature at this final stage was maintained at about 170 to 195 degrees C. Pressure was controlled at the approximate value of 300 psi.

Figure 2:
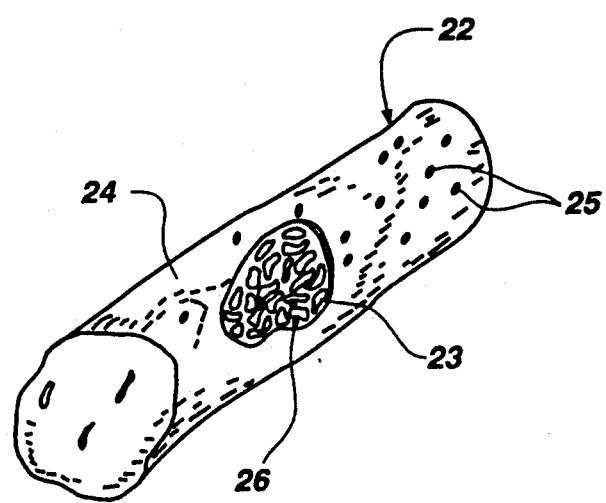
FIG. 2 graphically depicts a sample item of packaging material shown in perspective, elevated partial cutaway view.

The resultant product processed through the extruder barrel was then discharged through a die opening to generate expansion of the CO2 to form a closed cellular structure having a density less than 0.032 grams per cubic centimeter and with resilient properties which enable substantial return of the compressed structure to its original, expanded shape with structural integrity. This extrudate was rapidly sheared by a rotating blade to form short lengths of foamed starch material resembling conventional packaging peanuts. The material was allowed to solidify and resembled a configuration as shown in FIG. 2. This final product had a density of approximately 0.020 to 0.025 grams per cubic centimeter with compressibility of approximately 50 to 1000 grams per centimeter squared. Resiliency ranged from 60 to 85%. The structure had a continuous skin covering 24, and included interior, closed cell pockets 33 which were formed in a generally uniform dispersion.

If greater resistance against dissolution in water is desired, a small amount of borax 13 may be added either as an outer coating 25 which is dusted over the skin covering 24, or as an interior dispersion 26 within the foamed structure. It will be apparent that other fire retardant materials could also be utilized to enhance the hydrophobicity of the final product.

It has been deemed somewhat surprising to the inventors that the acids selected from the group of di- and tricarboxylic group would produce their multifunctional benefits without some attendant form of undesirable side effect. Because of this unexpected functionality, the present product is both more economical to produce, as well as providing the necessary low density, compressibility and resilience. Its simplistic composition and process demonstrates a cost productive invention which represents a significant step forward in the search for the ideal, biodegradable packaging material.

It is to be understood that the specific examples and disclosure rendered above is not to be considered restrictive, except within the limits as set forth in the following claims.

I claim:

1. A method for producing a foamed packing material of biodegradable composition, comprising the steps of:
   a) selecting a dry, powdered, starch material having no greater than 30% (w) water content;
   b) admixing to the starch material a mild acid in dry, powdered form selected from the group consisting of malic acid, tartaric acid, citric acid, maleic acid and succinic acid, said acid being at a composition percentage of 0.2 to 7% (w) of the total starch composition;
   c) admixing to the starch material a dry, powdered carbonate composition capable of reacting with acid to generate $CO_2$ gas, said carbonate composition being at a composition percentage of 0.1 to 2% (w) of the total starch composition;
   d) introducing the admixed dry materials of steps a), b) and c) within an initial stage of a screw impeller within an extrusion means;
   e) adding sufficient water to the dry materials of step d) at the initial stage of the impeller to convert the dry materials to a gelatinous state when subjected to elevated temperatures and pressures within the extrusion means;
   f) mixing and advancing the product of step e) within an extrusion barrel of the extrusion means to generate elevated heat and pressure for converting the material to the gelatinous state;
   g) concurrently reacting the acid within the extrusion barrel (i) with the starch material for decreasing molecular weight of the starch material while disrupting the uniformity of hydrogen bonding within and between starch chains, and (ii) with the carbonate material to produce $CO_2$ for expanding the starch at reduced molecular weight and increased structural randomness of the starch chains; and
   h) discharging the product of step g) through a die opening to generate expansion of the $CO_2$ to form a closed cellular structure having a density less than 0.032 grams per cubic centimeter and with resilient properties which enable substantial return of the compressed structure to its original, expanded shape with structural integrity.

2. A method as defined in claim 1, wherein the mixing step is more specifically defined to include the, steps of successively mixing, kneading and shearing the materials within the extrusion means.

3. A method as defined in claim 1, wherein the initial step of selecting starch comprises the more specific step of selecting a starch composition from the group consisting of potato starch, corn starch, tapioca starch and rice starch.

4. A method as defined in claim 1, comprising the more specific step of admixing to the starch material a mild acid in dry, powdered form selected from the group consisting of malic acid, tartaric acid, citric acid, maleic acid and succinic acid, said acid being at a composition percentage of 0.5 to 5% (w) of the total starch composition.

5. A method as defined in claim 1, comprising the more specific step of admixing to the starch material a dry, powdered carbonate composition which reacts with acid to generate $CO_2$ gas, said carbonate composition being at a composition percentage of 0.2 to 1% (w) of the total starch composition.

6. A method as defined in claim 1, comprising the more specific step of selecting a raw, dry, powdered, nonmodified starch material having no greater than 25% (w) water content.

7. A method as defined in claim 1, comprising the more specific step of admixing to the starch material a dry, powdered form of malic acid within the composition range of 0.5% to 5% (w) of the total starch composition.

8. A method as defined in claim 1, comprising the more specific step of mixing and advancing the combined ingredients of step e) within a twin screw extrusion barrel of the extrusion means to generate elevated heat and pressure for converting the material to the gelatinous state.

9. A method as defined in claim 1, comprising the more specific step of discharging the product of step f) as extrudate through a die opening to generate expansion of the $CO_2$ to form a closed cellular structure and sequentially severing small segments of the extrudate to develop small puffs of foamed starch useful as packing peanuts.

10. A method as defined in claim 1, comprising the more specific step of selecting a raw, dry, powdered, nonmodified starch material.

11. A method as defined in claim 10, comprising the more specific step of selecting a raw, dry, powdered, nonmodified starch material having no greater than 25% (w) water content.

12. A method as defined in claim 1, further comprising the step of adding a fire retardant constituent to the combined ingredients of step e) for the purpose of enhancing resistance of the extrudate against rapid dissolution when in contact with water.

* * * * *